United States Patent [19]

Thompson

[11] Patent Number: 5,332,485
[45] Date of Patent: Jul. 26, 1994

[54] ELECTROSTATIC FILTER

[75] Inventor: Donald E. Thompson, Modesto, Calif.

[73] Assignee: Contamco Corporation, Alexandria, Va.

[21] Appl. No.: 717,255

[22] Filed: Jun. 18, 1991

[51] Int. Cl.$^5$ .................................... B01D 35/06
[52] U.S. Cl. ............................ 204/302; 204/186; 210/232; 210/243
[58] Field of Search ............... 204/302, 304, 305, 306, 204/307, 308, 186, 188; 210/168, 232, 243, 748; 184/6.24

[56] References Cited

U.S. PATENT DOCUMENTS

| | | | |
|---|---|---|---|
| 3,252,885 | 5/1966 | Griswold | 204/302 |
| 3,544,441 | 12/1970 | Griswold | 204/186 |
| 3,729,402 | 4/1973 | Griswold | 204/302 |
| 3,852,178 | 12/1974 | Griswold | 204/186 |
| 3,891,528 | 6/1975 | Griswold | 204/186 |
| 4,594,138 | 6/1986 | Thompson | 204/302 |
| 4,800,011 | 1/1989 | Abbott | 204/302 |
| 4,961,845 | 10/1990 | Dawson et al. | 210/85 |

Primary Examiner—John Niebling
Assistant Examiner—William T. Leader
Attorney, Agent, or Firm—Joseph A. Cooke

[57] ABSTRACT

An electrostatic filter utilizes a series of parallel plates which are charged at differing potentials and separated by porous filter material to remove particulate matter from dielectric fluids. The filter includes a fluid tight housing which is constructed to include an easily removable filter cartridge comprised of a shell that conforms to the housing and includes the plate and porous filter elements. The housing further includes a quick disconnect end cap that includes an electrical connection to a power supply. An electrically conductive spring is interposed between the power supply and an adjacent plate. This arrangement allows for a very simple, safe, quick and cost effective procedure to change filter cartridges. The cartridge structure additionally allows for the easy checking of proper continuity between electrodes during the cartridge assembly.

3 Claims, 3 Drawing Sheets

ELECTROSTATIC FILTER

TECHNICAL FIELD

The present invention relates to apparatus for filtering particulate matter from fluids and more particularly to filters which are adapted to remove fine particulates, which are capable of being charged, from dielectric fluids.

BACKGROUND ART

The prior art includes filters for removing particulates from various dielectric fluids, such as oils and hydraulic fluids, by employing mechanical filtration. When mechanical filtration is employed to filter very fine particles of, for example, about 5 to 10 microns, difficulties may be encountered because these relatively small particles require large bulk and volume filters to avoid significant system pressure drops caused by the necessarily small filter openings.

Alternatives to mechanical filters for fine particle filtration of dielectric fluids include electrostatic filters where the fluid is made to pass through a number of electrodes which are alternately charged with relatively high positive and negative voltages. Porous filter material is placed between the electrodes for trapping the particulates. It appears that the particulates, when subjected to the electric fields created by the application of voltage to the electrodes, are filtered in one of two possible ways. The filter material itself may be charged with the particulates being attracted to the filter material itself. More likely, however, the particulates are charged, either positively or negatively, depending on their composition, and the oppositely charged particles will be attracted to each other and eventually form a floc of larger particulate clumps which will be large enough to be trapped in the filter material. Whenever enough clumps form to effectively block the filter or produce an undesirable pressure drop, the filter must be replaced. While these electrostatic filters have evolved over a number of years, these filters still present a number of problems in terms of ease of fabrication and testing, as well as ease of replacement and safety of replacement, with attendant cost savings.

SUMMARY OF THE INVENTION

Accordingly, it is an object of this invention to provide an improved electrostatic filter for filtering fluid borne particulates.

It is another object of this invention to provide an improved electrostatic filter which may be easily assembled.

It is a further object of this invention to provide an improved electrostatic filter which may be easily tested for proper assembly.

It is still another object of this invention to provide an improved electrostatic filter whose functional filter elements may be easily replaced.

It is a still further object of this invention to provide an improved electrostatic filter whose functional filter elements may be safely replaced.

It is yet another object of this invention to provide an improved electrostatic filter which may be fabricated with cost savings.

It is a yet further object of this invention to provide an improved electrostatic filter whose functional filter elements may be replaced more quickly and at less cost.

Briefly, these and other objects may be achieved with an electrostatic filter with a replaceable cartridge, including functional filter elements, including electrodes and porous filter material within a shell, the cartridge, in turn, being contained within a fluid tight housing, the housing having a quick-disconnect fitting which carries both the fluid flow and a means to apply high voltage to the cartridge when the fitting is in place as part of the housing.

DETAILED DESCRIPTION OF THE INVENTION

Figure 1:
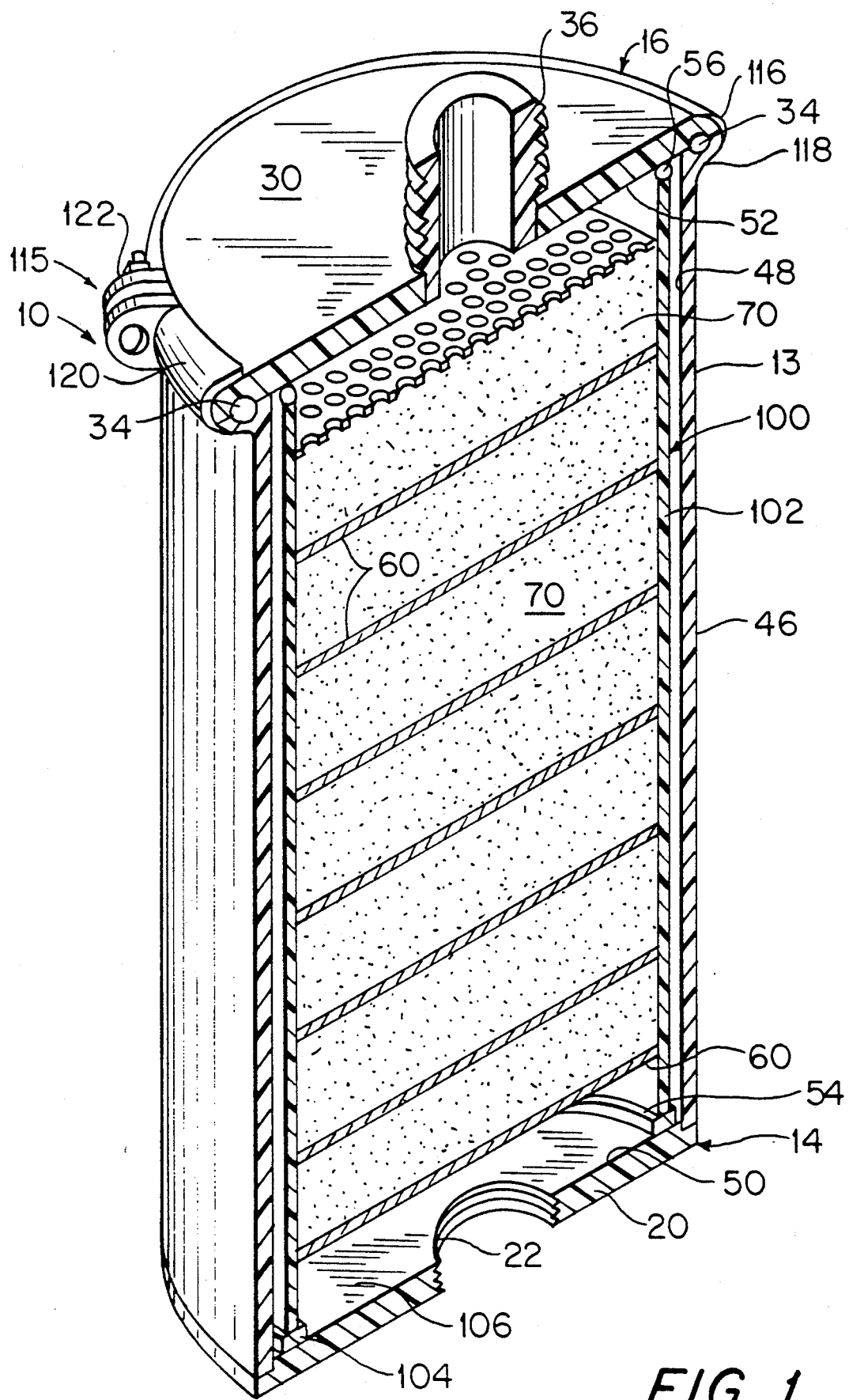
FIG. 1 is a cross-sectional, perspective view of the electrostatic filter according to the invention along its longitudinal axis.
Figure 3:
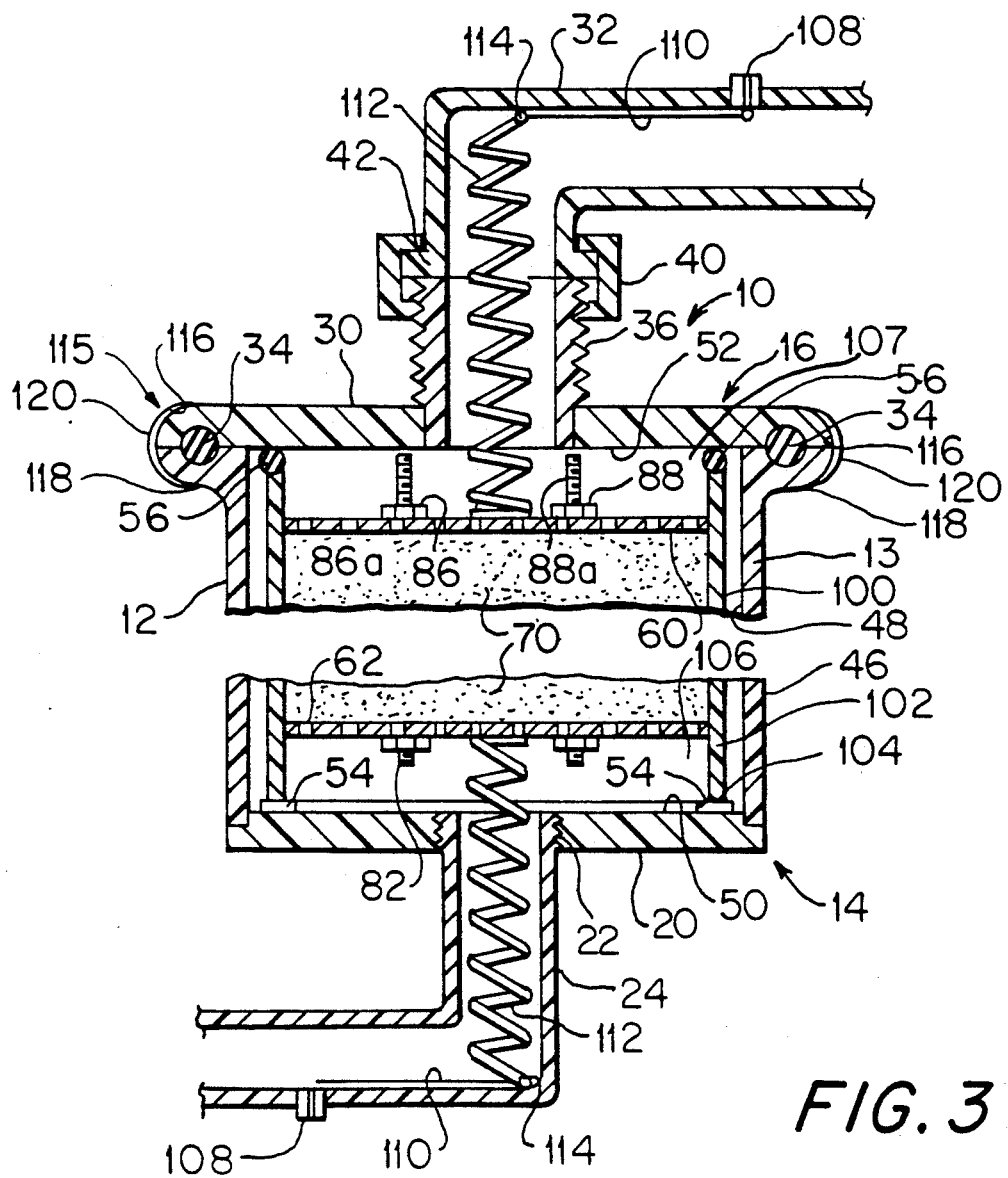
FIG. 3 is a cross-sectional view, along the longitudinal axis of the filter of FIG. 1, additionally including cross-sectional views of inlet and outlet fittings attached to the filter.

Referring more particularly to the drawings, the electrostatic filter of one embodiment of the present invention is generally indicated by the numeral 10 in FIGS. 1 and 3. As shown therein, the filter 10 has a housing or case 12, including an open-end side-wall 13 of substantially cylindrical construction which is substantially symmetrical about its longitudinal axis. The housing has a first or inlet end portion 14 and an opposite, second or outlet end portion 16 spaced longitudinally therefrom. The inlet end portion 14 includes inlet end cap 20 while the outlet end portion includes outlet end cap 30, both of which may be made easily removable. In this embodiment, however, only the outlet end cap 30 is provided with a quick-disconnect feature which will be more fully described, infra. The housing is of predetermined dimensions and provides an interior volume generally related to the anticipated rate of flow of fluids through the particular fluid system in connection with which the filter is adapted to be used. The housing is preferably made of a non-conductive material, such as a plastic, for reasons related to ease and cost of construction as well as ease of electrical isolation from the high voltages that must enter the housing.

Filter 10 is provided with a replaceable filter cartridge 100 which is sized to substantially fill the housing, but it is somewhat smaller in both length and diameter than the interior of the housing so that the cartridge may be easily inserted and withdrawn from the interior of the housing. The exterior wall cartridge 100 is formed by open cylinder shell 102 which also serves as a partial support and assembly jig for the filter components within the shell which include planar electrodes, filter material, and high voltage connections contacting the electrodes. Shell 102 is also preferably constructed of a non-conductive material, such as a plastic, for the same reasons as given above with respect to the housing. The cartridge structure will also be more fully described, infra.

As can be seen in FIGS. 1 and 3, the substantially circular inlet end cap 20 is secured in a fluid-tight relation, as part the inlet end portion 14, to side-wall 13. The end cap 20 has a centrally disposed threaded portion 22 for receiving, in a fluid-tight fashion, a cylindrical inlet tube 24. The portion of the inlet tube 24 that is secured to threaded portion 22 has a longitudinal axis which is disposed substantially coextensively with the longitudinal axis of the housing 12. The inlet tube can be connected to an appropriate fluid supply conduit or delivery line (not shown) with an appropriate fluid-tight snap or threaded fitting for the delivery of fluid from the conduit to the inlet tube and, thereafter, into the housing 12.

The outlet end cap 30, of substantially circular configuration, is secured, as part of the outlet end portion 16, in a substantially close-fitting, fluid-tight relation to side-wall 13, at the end which is remote from the inlet end portion 14. Its fluid-tight relationship with the side-wall is made possible, in this embodiment, by O-ring 34. An outlet tube 32 is deployed substantially centrally thereof and has a longitudinal axis, where connected to the outlet end cap 30, disposed substantially coaxially with that of the inlet tube 24. End cap 30 includes a threaded external portion 36 which extends axially from the end cap, the threaded portion allowing for a fluid-tight coupling to outlet tube 32 by means of threaded clamp ring 40 and circular flange 42 formed on the end of the outlet tube 32. Similar to the inlet tube 24, the outlet tube 32 is adapted to be connected in fluid-flow relationship by a fluid conduit or delivery line (not shown) of conventional design, in a fluid system, to permit the flow of fluid from the housing 12, to the conduit.

The housing side-wall 13 has an exterior surface 46 and an interior surface 48 with a predetermined internal diameter. As shown in FIGS. 1 and 3, replaceable filter cartridge 100 is sized to generally fill the volume defined by interior surface 48, the interior surface 50 of end cap 20 and the interior surface 52 of end cap 30. While it is advantageous to have the cartridge, in essence, fill the interior volume of housing 12, the cartridge should not be so tight fitting, in terms of its diameter, that removal from the case, for replacement purposes, is made difficult. However, the length of shell 102 should be very close to the distance between the interior surfaces 50, 52 of end cads 20, 30. This is necessary because it is important that the shell be effectively sealed between the end caps. This is accomplished by having the shell length cut just short of the distance between the end caps and having the remainder of the distance made up by resilient means. In the instant embodiment, compliant washer 54 is affixed to interior surface 50 and compliant O-ring 56 is affixed to the end of shell 102 that faces surface 52. Washer 54 is sized to have the same general diameter as the shell with the washer's radial width somewhat overlapping the shell thickness. O-ring 56 is sized to have the same general diameter as the shell with the cross-sectional diameter of the O-ring material being essentially the same as the shell thickness but somewhat overlapping. With the shell, the O-ring and the washer in place, the total length of these elements along the axial length of the filter should be slightly more than the interior distance between the end caps so that upon insertion of the cartridge and the replacement and securing of end cap 30, washer 54 and O-ring 56 are squeezed down sufficiently to form a liquid-tight seal between the interior and the exterior of the shell. While there is no requirement that this sealing arrangement be absolutely liquid tight, it should be recognized that because the inner volume of shell 102 contains the filter elements, any portion of the liquid that enters the filter from the inlet tube 24 that is able to escape passage through the filter elements and, instead, by-passes the filter elements by passing washer 54 to the volume outside of the shell, will be unfiltered. As a result thereof, the substantially filtered liquid that exits through the outlet tube 32 will be degraded to the extent that the unfiltered liquid is able to enter from the exterior of the shell, past the O-ring 56, to the outlet tube.

Figure 2:
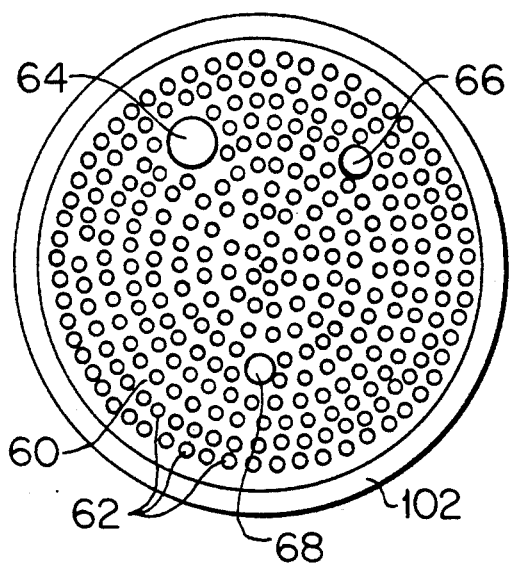
FIG. 2 is a planar view of a metal electrode employed in the electrostatic filter of FIG. 1, transverse to the longitudinal axis of the filter.

As shown in FIGS. 1 through 4, a plurality of porous, substantially planar, electrically-conductive metal electrodes 60, having a substantially circular configuration, are disposed within, and partially supported by, shell 102. FIG. 2 depicts an electrode 60, in cross-section, in planar view, as it appears within shell 102. The diameter of the electrodes should be only slightly less than the internal diameter of the shell so that they fill the interior of the shell, yet allow for the easy insertion of the electrodes as well as the other, later-described functional filter elements, within the shell. The electrodes are spaced apart with the spacing being generally equal and determined by considerations related to the voltages to be applied to the electrodes and the dielectric values of the fluids to be filtered. It is important that the electrode facing end cap 20 be spaced within the shell so that, upon insertion of cartridge 100, with shell edge 104 abutting washer 54, the electrode is spaced from the inlet end cap a sufficient predetermined distance to provide an inlet pooling chamber 106, thereby providing a sufficient incoming volume for fluid entry. Similarly, and as will be more fully described below, the electrode 60 facing the outlet end cap 30 is spaced within the cartridge shell 102 a sufficient predetermined distance to provide an outlet pooling chamber 107, thereby providing a sufficient volume for fluid exit. Each electrode 60 has a multiplicity of perforations or bores 62 therethrough. The number and diameter of these bores should be sufficient to allow for the passage of the fluid to be filtered at the particular operational pressures and flow-rates. On the other hand, The number and diameter of the bores should not be such that the electrode cannot present a substantially uniform field. The electrode material, as long as it is conductive, is not important, except that it should not, under operating conditions, and with the particular support structure provided, substantially flex or deform, nor should it degrade, physically or chemically, in the presence of the fluid being filtered.

Figure 4:
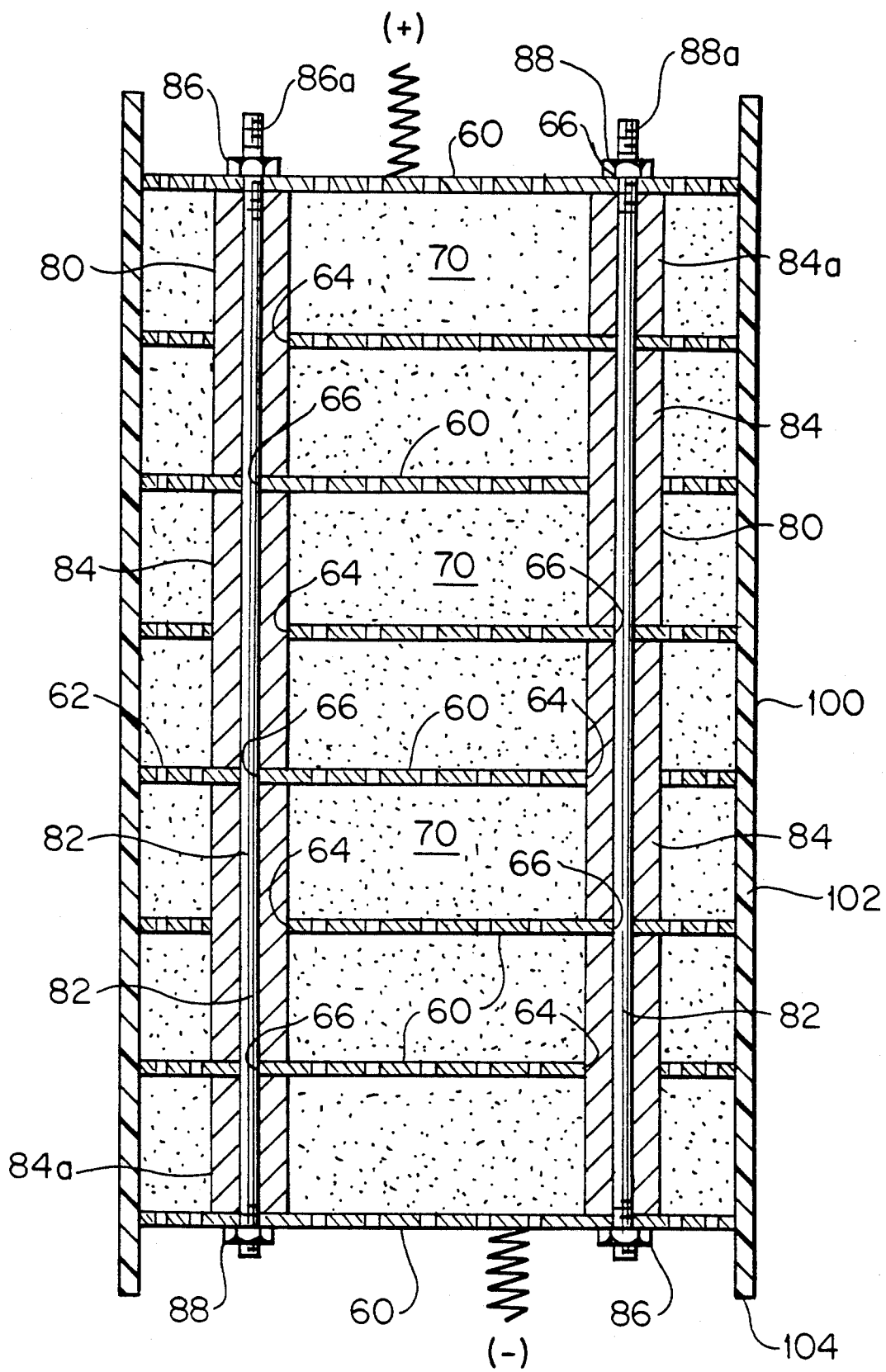
FIG. 4 is a cross-sectional, longitudinal view of the filter cartridge of FIG. 1, off-set from the filter axis and through the axes of metal electrode rods included in the cartridge.

Each electrode 60, in addition to the above-described bores, has a plurality of holes punched or otherwise cut therethrough. As shown in FIG. 2, there are three such holes 64, 66, and 68, large hole 64 and small hole 66 being for receiving busses for applying power to the electrodes and hole 68 for receiving a non-conductive structural support rod. Although not shown here or discussed in detail, it is understood that where the size of the filter so requires, a support rod threaded at its ends may be inserted through the electrodes and pads and a nut tightened on the threaded portion of each end of the support rod to the extent that it abuts the surface of the electrodes facing the end caps 20 and 30 and provides a more rigid cartridge assembly. In addition to the arrangements discussed above, each individual electrode may be bonded or otherwise fastened to the adjacent portion of the support rod. All of the electrodes 60 employed in the cartridge 100 have the large hole 64 and the small hole 66 except for the two electrodes which face the inlet and outlet end caps 20, 30. These electrodes have instead, for reasons to become apparent, two small holes 66 (not shown in FIG. 2), as shown in FIG. 4. While the instant embodiment has three holes, the minimum is two because of the power requirements. If the filter design and the fluid pressure are such that the electrodes will not substantially flex in operation, then the inherent support furnished by the bussing arrangement, to be hereinafter described in detail, may be sufficient to support the electrodes 60. On the other hand, other designs and operating conditions may require more than one support rod. The relationship between the structure of the electrodes 60 and the bussing arrangement will be hereinafter described.

Filter pads 70, of substantially the same diameter as electrodes 60, as shown in FIGS. 1, 3 and 4, provide both the filtering material to trap the filtered particulates as well as the required spacing for the electrodes. Preferably, the filter pads are constructed of reticulated foam or similar material having communicating pore or open cell structure. Almost any porous material can be used as long as it is not electrically conductive, it will not physically or chemically degrade in the presence of the fluids being filtered, and its pore size is small enough to trap the fluid-borne particulates yet large enough, like the electrode bores, to be compatible with the required operational pressures and the filtered fluid flow rates. As inferred in the paragraph immediately above, it should be understood that the pads will be formed with holes for accommodating the bussing arrangement, as well with those holes that may be required for any support rods. These holes will conform to, and be in alignment with, those holes provided in the electrodes 60, such as holes 64, 66, and 68.

The plurality of electrodes 60 and pads 70 are disposed alternately, in a close-fitting, overlaying relation to each other, to provide a stack of electrodes and filters, as can best be seen in FIGS. 1 and 4, whereby adjacent electrodes are capable of being oppositely charged. A pair of buss bars 80 are provided to apply appropriate alternate polarity voltages to alternate electrodes 60. The buss bars, which run parallel to, but are off-set from the filter axis, also provide the structure for providing the predetermined spacing between the electrodes as well as a portion of the mechanical support structure for keeping the electrodes rigidly positioned. The buss bar structure must perform the functions of applying the positive and negative high voltages, respectively, to alternate electrodes, allowing for proper spacing between the electrodes, and providing for adequate, over-all support of the electrode structure. In the perspective view of FIG. 1 the off-set buss bars are hidden. FIG. 4, however, shows a cross-section of the filter cartridge 100 through the axes of the buss bars 80. As depicted in FIG. 4, each buss bar is comprised of a metal electrode threaded rod 82, a series of insulating spacers 84 and 84a, metal nuts 86 and insulating screws 88.

The buss bar design employed in the instant embodiment employs a simple and effective way of applying the required opposite voltages to every other electrode 60. Each of the two metal electrode threaded rods runs through the hollow core of a plurality of the insulating spacers 84, each of which has a given length. The length of the insulating spacers 84 is the predetermined distance between three electrodes. In this way, spacer 84 is passed through the large hole 64 of every other electrode 60 and, in this way, the spacer 84 effectively provides electrical isolation or insulation between the electrode rods 82 and the electrode 60 to be isolated. At the same time, the spacers 84 abut the other set of alternate electrodes at their small hole positions 66. This allows for electrically conductive connections to be made between the electrode rods 82 and the electrodes 60 at the small hole 66 positions, the small hole diameters being essentially the same as the electrode rod diameters. These conductive connections may be made by a pair of nuts (not shown), if the rods are threaded throughout their length, tightened around either side of the electrodes, by conductive glue or epoxy, by welding, or the like. FIG. 4 shows the customary arrangement whereby alternate electrodes are contacted by each respective rod at the small hole 66 position of the electrodes.

One of the rods contacts one set of alternate electrodes at their small hole 66 positions while the other rod contacts the other set of alternate electrodes at their small hole positions. To do so requires that the small holes are arranged, from one electrode to the next, from one side to the other. It may be noted that, if symmetry is maintained around a diameter line between the large and the small holes, 64,66, (and any support holes present) with respect to the centers of these holes, then the same electrodes may be used (except for the electrodes facing the end caps) by simply turning the electrodes over, one way or the other. The electrodes facing the end caps employ the two small holes 66 (not shown) so that the metal nuts 86 and the insulating screws 88 have mating retaining surfaces to tighten down upon. Insulated spacers 84a are essentially one-half the length of spacers 84, i.e., they have a length equal to the space between adjacent electrodes. Unlike spacers 84, they are threaded at each end. In FIG. 4, there is one spacer 84a as part of the left bus bar 80, at the bottom, and one as part of the right bus bar 80, at the top. In each case, the structure of the spacer 84a allows the electrode rod 82 to screw into one side of the spacer while insulating screw 88 screws into the other side of spacer 84a without carrying the voltage on the electrode rod to be carried to end electrodes facing the end caps. As hereinafter explained and depicted by FIG. 3, when the filter is completely assembled, springs 112, in compression, apply the opposite polarity sides of a high voltage power supply to the end electrodes. Without the presence of the spacer 84a—insulating screw 88 arrangements, the power supply would be short-circuited. The screw head design and the rod lengths may be made such that they protrude away from the end electrodes a substantial distance so that, in the event that the electrode 60—filter pad 70 structure slips with respect to the cartridge shell 102, the pooling areas between the end electrodes and the end caps will be maintained. Protrusions are shown in FIG. 3 and FIG. 4 as elements 86a and 88a.

As can be now clearly seen, the proper continuity between a given electrode 60 and a given bus bar 80 can be easily and accurately checked because the rod—electrode—filter pad assembly is completed prior to insertion into the cartridge shell. 102. This leaves the rods and the electrodes completely exposed.

A d.c. power supply (not shown), capable of outputting high voltages in the range of from about 5,000 to 50,000 volts, is indirectly connected to filter 10 by conventional high voltage insulated leads (not shown) which enter into the system, either through the fluid delivery lines which are connected to the inlet and outlet tubes 24 and 32, or the inlet and outlet tubes themselves. This may be accomplished by having the high voltage leads, one of which is connected to the positive side of the power supply and the other of which is connected to the negative side of the power supply, connected to feed-throughs 108 which are mounted on and through the delivery lines or the inlet and outlet tubes, as shown in FIG. 3. The feed-throughs are conductively connected to conductive strips 110 which run through, and are bonded to, the interior surfaces of the inlet and outlet tubes, as shown, or may, alternatively, be embedded within the material of these tubes. The conductive strips are, in turn, conductively connected to springs 112 which are rigidly mechanically connected to the interior of the inlet and outlet tubes at points 114. The spring material is, itself, conductive and substantially rigid and the mechanical connection points lie substantially on the longitudinal axis of the filter 10. The free-standing length of the springs are somewhat longer than its compressed length when the complete filter is assembled as shown in FIG. 3 because of the requirement that the springs, which play an essential part in the quick disconnect (and connect) feature, make a good electrical contact with the electrodes 60 which directly face the two springs. This results in alternate electrodes 60 in the filter cartridge 100 being oppositely charged due to the structure of the bus bars 80 as shown in FIG. 4, as previously discussed.

To acheive the advantages of the spring configuration 112 with respect to quick removal and safety, it should be understood that it is within the scope of this invention that only one spring configuration is required provided that the removable cartridge is otherwise aprropriately connected, as may be necessary, to a source of power. Furthermore, while the electrical springs 112 are shown partially within the fluid inlet and fluid outlet, it should be understood that these springs could be interposed between the inside surface of the end caps and the adjacent electrode, assuming an appropriate conductive connection to a sorce of high voltage.

The end cap 30 is releasably connected to the cylindrical sidewall 13 of housing 12 by any convenient quick fastening means such as a Marmon clamp 115 depicted in FIG. 1 and FIG. 3. The clamp 115 is designed to embrace a curved surface portion 116 of the end cap 30 and a curved surface portion 118 of the sidewall 13 with a conforming metal band 120. The band 120 is contracted and expanded through a tightening mechanism 122, typically a nut and bolt through flanges protruding from the band 120.

Because of the design of outlet end cap 30, along with the manner in which the high voltage is applied through compressed springs 112, the replacement of used cartridges is made both quick and simple. In operation, the clamp 115 is released and the end cap 30 is removed, with the outlet tube 32 and its fluid delivery line still connected. Thereafter, the used filter cartridge is withdrawn from the housing 12 and a new filter cartridge is inserted. The final assembly is completed by the cap simply being put in place and secured with the clamp 115. No additional steps are required to apply high voltage to the cartridge because the springs automatically do so by placing them in compression when the cap 30 is secured.

Filter 10 may generally be employed to filter any conventional dielectric fluid and may be particularly useful for filtering hydraulic and lubricating fluids. The filter may be used as part of a system that removes particulates from a stored volume of used fluid or, alternatively, may be employed as part of a working system that removes the particulates as they occur. In either event, the filter is connected in a fluid flow relationship to a fluid supply by the system fluid delivery lines. Preferably, although not necessarily, the housing 12 is disposed in a substantially axially erect attitude with the outlet end portion 16 elevated above the inlet end portion 14 to afford maximal distribution of the fluid within the housing and, accordingly, a maximal contact of the fluid with the electrodes 60 and the filter pads 70.

In operation, fluid is permitted to flow through the inlet tube 24 at the inlet end portion 14 from the fluid delivery line. For most conventional fluid systems, the rate of flow of the fluid will be sufficiently slow such that fluid entering the housing 12 from the inlet tube 24 will well or pool between the end cap 20 and the electrode 60 facing inlet tube 24 with the result that the fluid will substantially contact the electrode. As the volume of the fluid entering the housing 12 through the inlet tube 24 increases, the fluid will flow generally axially through the housing along a flow path from the inlet end portion 14 toward the outlet end portion 16.

Particulate matter carried by the fluid, constituting a contaminant, will contact the various electrodes 60 before passing through the bores of the respective electrodes. As the fluid borne particulate matter comes into substantial contact with the various electrodes, the particulates will take on the charge, positive or negative, of the electrode contacted. As the incoming fluid passes the first electrode into the first filter pad 70, sufficiently large particles will be mechanically filtered from the fluid by the trapping action of the pad. The fluid passing from the first filter pad toward the next, oppositely charged, electrode will cause many of the previously charged particles to be brought into engagement with the oppositely charged electrode and many of the previously uncharged particles will, upon contact with the oppositely charged electrode, pick up the charge of that electrode. As the fluid progresses through the filter, oppositely charged particles, when randomly brought into proximity with each other, will be attracted to each other and form a clump or floc. This process will continue with progressive increases in size of the flocculated particulate matter. The increased size of the resulting flocs allows for the mechanical filtration by succeeding filter pads 70.

The construction, including the number of electrodes and filter pads, as well as the dimensions of the filter 10 can be widely varied according to its particular application. One design having 17 electrodes sandwiched about reticulated 1.58 cm. foam filter pads with about 80 pores per square inch of surface area proved effective in filtering particles with diameters from about 0.5 to 10 microns. The electrodes employed would typically have bore diameters in the range of about 1/16 to ⅛ of an inch.

Further design variations could have electrodes in the form of screens, pads with different porosity, e.g., from about 20 to 100 pores, or higher, or pads with various porosities within the same filter. The pore design employed would generally be dictated by the anticipated contamination, fluid pressure of the system, and the range of diameters of the particulate matter to be filtered. For instance, the filter pads from the inlet end portion to the outlet end portion may progressively decrease in porosity, and, in this way mechanical filtration may be maximized in relation to a minimal drop in the system fluid pressure. It should also be recognized that filtration rates and pressure drops can be varied by placing filters of a given design in series and/or parallel.

What has been disclosed is one embodiment of the invention which is very effective in terms of electrostatically filtering fluid borne particulates from a dielectric fluid. The disclosed filter is easily assembled and may be easily tested. The filter may be easily, quickly, and safely replaced and at a lower cost than prior art, similar filters.

Obviously, numerous modifications and variation of the present invention are possible in light of this disclosure. It is, therefore, to be understood that within the scope of the appended claims the invention may be practiced other than as specifically described herein.

I claim:

1. A filter cartridge for an electrostatic filter, including:

a non-conductive cylindrical shell, said shell having a longitudinal axis;

a plurality of electrically-conductive electrode members within said shell, said electrode member spaced from each other along the longitudinal axis of said shell to form a stacked array, each electrode member having a substantially planar body with a pair of apertures therethrough in spaced relation to each other and providing edge portions on said electrodes, one of said apertures being larger than the other of said apertures, said electrode members stacked with the smaller aperture of one electrode in axial alignment with the larger aperture of an adjacent electrode;

a plurality of porous filter media pads individually disposed between adjacent electrodes;

a plurality of electrically conductive buss bars for applying a voltage potential to said electrodes extending axially of said shell, the diameter of said buss bars being substantially that of said smaller aperture of the electrodes, each buss bar passing through the aligned holes in said electrode members and through the filter media pads, said buss bars being in electrical contact with said edge portion of said smaller apertures and spaced from said edge portions of said larger apertures; and a plurality of non-conductive spacers disposed coaxially of said buss bars adjacent said larger apertures, said spacers filling the space formed between said buss bars and the edge portions of said larger aperture to electrically insulate said buss bar from said electrode.

2. The filter cartridge of claim 1 wherein each electrode member is disposed substantially transverse of said non-conductive shell and has dimensions providing a peripheral edge portion configured to closely conform to the internal surface of the shell.

3. The filter cartridge of claim 2 wherein each porous filter media pad is disposed substantially transverse of said non-conductive shell and has a peripheral edge portion disposed in close fitting relation to the internal surface of the shell.

* * * * *